United States Patent [19]
Dennis et al.

[11] Patent Number: 5,299,868
[45] Date of Patent: Apr. 5, 1994

[54] CRYSTALLINE TRANSDUCER WITH AC-CUT TEMPERATURE CRYSTAL

[75] Inventors: John R. Dennis; Charles D. Totty, both of Duncan, Okla.

[73] Assignee: Halliburton Company, Duncan, Okla.

[21] Appl. No.: 12,820

[22] Filed: Feb. 3, 1993

[51] Int. Cl.$^5$ .............. G01K 11/22; G01L 19/04; H01L 41/04
[52] U.S. Cl. .................. 374/117; 374/143; 310/361; 73/702; 73/708
[58] Field of Search .......... 374/117, 143; 310/361; 73/702, 708

[56] References Cited

U.S. PATENT DOCUMENTS

| | | | |
|---|---|---|---|
| 3,355,949 | 12/1967 | Elwood et al. | 73/345 |
| 3,561,832 | 2/1971 | Karrer et al. | 310/9.6 |
| 3,617,780 | 11/1971 | Benjaminson et al. | 310/8.2 |
| 4,079,280 | 3/1978 | Kusters et al. | 310/318 |
| 4,160,183 | 7/1979 | Kusters et al. | 310/315 |
| 4,216,402 | 8/1980 | Engdahl | 310/320 |
| 4,437,773 | 3/1984 | Dinger et al. | 374/117 |
| 4,472,656 | 9/1984 | Franx | 310/361 |
| 4,479,070 | 10/1984 | Frische et al. | 310/338 |
| 4,498,344 | 2/1985 | Dinger | 73/778 |
| 4,512,198 | 4/1985 | Sinha et al. | 73/703 |
| 4,547,691 | 10/1985 | Valdois et al. | 310/361 |
| 4,562,375 | 12/1985 | Besson et al. | 310/338 |
| 4,592,663 | 6/1986 | EerNisse et al. | 374/117 |
| 4,760,351 | 7/1988 | Newell et al. | 310/320 |
| 4,802,370 | 2/1989 | EerNisse et al. | 73/702 |
| 5,012,151 | 4/1991 | EerNisse et al. | 310/346 |

FOREIGN PATENT DOCUMENTS

| | | | |
|---|---|---|---|
| 0183128 | 7/1990 | Japan | 374/117 |
| 0972263 | 11/1982 | U.S.S.R. | 374/143 |
| 0998874 | 2/1983 | U.S.S.R. | 374/117 |
| 2202989A | 10/1988 | United Kingdom . | |

OTHER PUBLICATIONS

"Quartz Resonator Mounting and Packaging: Requirements and Tehcniques", Roger W. Ward, pp. 162-175 of 5th Quartz Crystal Conf. Proc. (1983).

"Processing of a Five Reasontor VHF Crystal Device", C. W. Shanley, L. N. Dworsky, J. A. Whalin, G. C. Clifford & M. N. Scansaroli, pp. 367-371 of Proc. Freq. Control Symp. (1985).

"The Motorola Multi-Pole Monolithic Filter Project", L. N. Dworsky and C. S. Shanley, pp. 486-490 of Proc. Freq. Control Symp. (1985).

Primary Examiner—Diego F. F. Gutierrez
Attorney, Agent, or Firm—Stephen R. Christian; E. Harrison Gilbert, III

[57] ABSTRACT

An apparatus and method for sensing temperature in an oil or gas well use an AC-cut temperature crystal connected to a Z-cut crystalline member contained in a crystalline housing that can be subjected to high pressures and temperatures.

12 Claims, 2 Drawing Sheets

CRYSTALLINE TRANSDUCER WITH AC-CUT TEMPERATURE CRYSTAL

BACKGROUND OF THE INVENTION

This invention relates generally to a crystalline resonator package that includes an AC-cut crystal as a temperature sensor. Such a temperature responsive AC-cut crystal provides an improvement in a pressure and temperature transducer of the type including a crystalline housing subjected to pressure and temperature in an oil or gas well. The present invention also relates to a method of sensing temperature in an oil or gas well.

During drilling, completing and producing an oil or gas well, temperature and pressure measurements are typically taken from within the well to obtain information about the ability of the well to produce oil or gas. This can be done by lowering a quartz crystal pressure and temperature transducer into the well and generating electrical signals in response to the frequencies at which the quartz crystal members oscillate in response to sensed pressure and temperature. Typically a quartz crystal reference member is also provided for compensating for changes in response due to pressure or temperature. This reference member and the temperature sensing member can be housed together.

A pressure and temperature transducer currently used by Halliburton Services to measure pressure and temperature in an oil or gas well includes three active elements. These are implemented by quartz resonators mounted within a quartz housing made of two separate crystalline packages held adjacent each other. One of these packages contains the crystalline resonator that senses pressure applied to the housing, and the other package contains both a crystalline resonator that senses temperature communicated through the housing and a crystalline resonator that functions as a reference to compensate for temperature effects on the pressure sensing resonator. In a particular implementation, the temperature resonator is a torsional mode tuning fork (TTF) quartz crystal. See, for example, U.S. Pat. No. 4,802,370 to EerNisse et al.

Although this type of pressure and temperature transducer is suitable for many oil and gas wells, the use of a TTF temperature crystal limits the temperature range within which it can be used. A TTF crystal has difficulty oscillating at temperatures above 175 degrees centigrade (° C.). A TTF crystal can also have a temporary loss in activity within the low temperature range from $-10°$ C. to $-15°$ C. due to condensation of gaseous lead tetrahydride that can form within the crystalline package when it is sealed. Special sealing techniques can be used to prevent this, but they are time consuming and expensive. Thus, there is the need for an improved temperature transducer and temperature sensing method providing an extended operating range relative to the aforementioned transducer incorporating a TTF temperature crystal.

SUMMARY OF THE INVENTION

The present invention overcomes the above-noted and other shortcomings of the prior art by providing a novel and improved temperature transducer and more particularly a crystalline resonator package that includes an AC-cut crystal as a temperature sensor. Such a temperature responsive AC-cut crystal improves a pressure and temperature transducer of the type including a crystalline housing subjected to pressure and temperature in an oil or gas well. The present invention also relates to a method of sensing temperature in an oil or gas well. An advantage of the present invention is its extended temperature operating range. Another advantage of the present invention is its utility in high pressure environments.

In a pressure and temperature transducer of the type including a crystalline housing subjected to pressure and temperature in an oil or gas well, the present invention provides the improvement comprising a temperature resonator including an AC-cut crystal mounted in the crystalline housing.

In another aspect of the present invention, it provides a dual crystalline resonator package, comprising: a crystalline housing; a crystalline reference resonator mounted in the crystalline housing; and a crystalline temperature resonator mounted in the crystalline housing, wherein the crystalline temperature resonator is an AC-cut quartz crystal.

The present invention also provides a method of sensing temperature in an oil or gas well, comprising: lowering a crystalline housing into the well, the crystalline housing having an AC-cut crystal disposed therein; exposing the crystalline housing to pressure and temperature in the well; and responding to the temperature with the AC-cut crystal.

Therefore, from the foregoing, it is a general object of the present invention to provide a novel and improved temperature sensing apparatus and method particularly for an oil or gas well. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

The invention disclosed and claimed herein involves the replacement of a torsional mode tuning fork (TTF) temperature crystal with an AC-cut temperature crystal in an otherwise conventional crystalline transducer package capable of withstanding high pressures of the type found in oil or gas wells. Although an AC-cut crystal has been used for sensing temperature, to our knowledge it has only been used in sealed metal packages which have not been suitable for high pressure application such as in oil or gas wells.

More particularly, the present invention involves mounting an AC-cut crystal to a Z-cut quartz plate in the same manner as the SC-cut reference crystal is mounted in the temperature/reference package of a pressure and temperature transducer used by Halliburton Services. Mounting is preferably such that the stresses imposed by differing thermal expansion coefficients are minimal. Two Z-cut plates, one with a mounted SC-cut crystal and the other with an AC-cut crystal are hermetically sealed at high temperature. This all quartz package is then placed adjacent a conventional pressure sensor in the transducer.

One advantage of replacing a TTF crystal with an AC-cut crystal is that the AC crystal provides for an increased operating range with respect to temperature. Whereas a TTF temperature crystal can have difficulty oscillating at temperatures exceeding 175° C., four AC-cut crystals mounted in otherwise conventional crystalline temperature/reference packages have been successfully tested to 200° C. in a laboratory. No appreciable loss in amplitude was observed. The upper limit of operation is not known at this time, but we have tested can-mounted AC-cut temperature crystals to 250° C. in the lab and we believe that this can be achieved with the crystalline temperature/reference package. Furthermore, the AC-cut temperature crystal provides for operation at temperatures lower than the TTF temperature crystal can accommodate. A significant percentage of temperature/reference packages are sealed with minute amounts of gaseous lead tetrahydride which can cause a temporary loss in activity of the TTF crystal as the gas condenses at $-10°$ to $-15°$ C. Special sealing techniques can be employed to prevent this from happening, but they are time consuming and expensive. Special sealing techniques are not needed with the AC-cut crystal as used in the present invention. No activity problems have been observed in the presence of the gas with the AC-cut crystals.

Another advantage of the present invention is that the AC-cut crystal can be used in high pressure environments such as are found in oil or gas wells. More particularly, the AC-cut crystal functions properly when it replaces the TTF temperature crystal in the crystalline temperature/reference package used by Halliburton Services.

Figure 1:
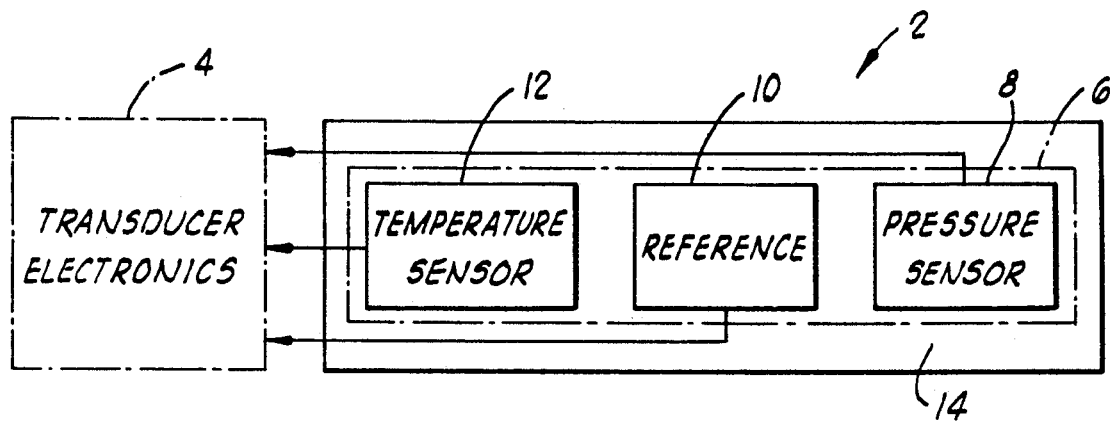
FIG. 1 a block diagram of a pressure and temperature transducer wherein the improvement of the present invention can be used.
Figure 2:
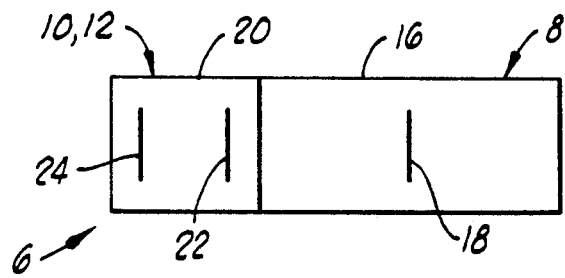
FIG. 2 is a representation of a particular implementation of the transducer shown in FIG. 1, which representation is disclosed in U.S. Pat. No. 4,802,370 to EerNisse et al.
Figure 3:
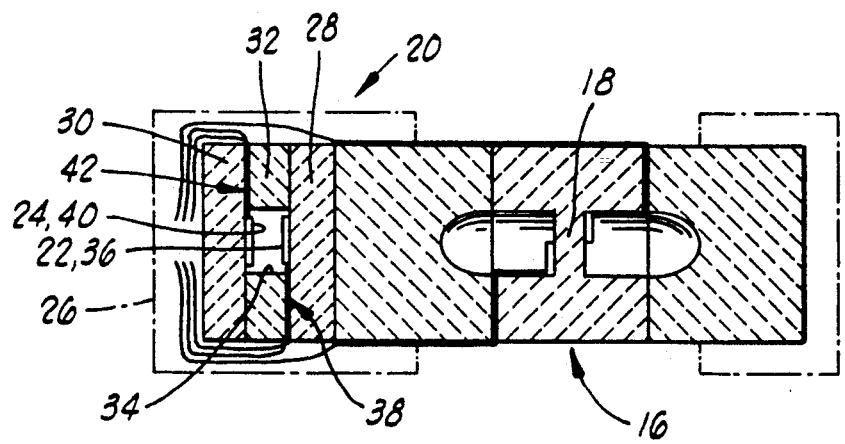
FIG. 3 is a longitudinal sectional view of a specific embodiment of the FIG. 2 representation, which specific embodiment is also disclosed in U.S. Pat. No. 4,802,370.
Figure 4:
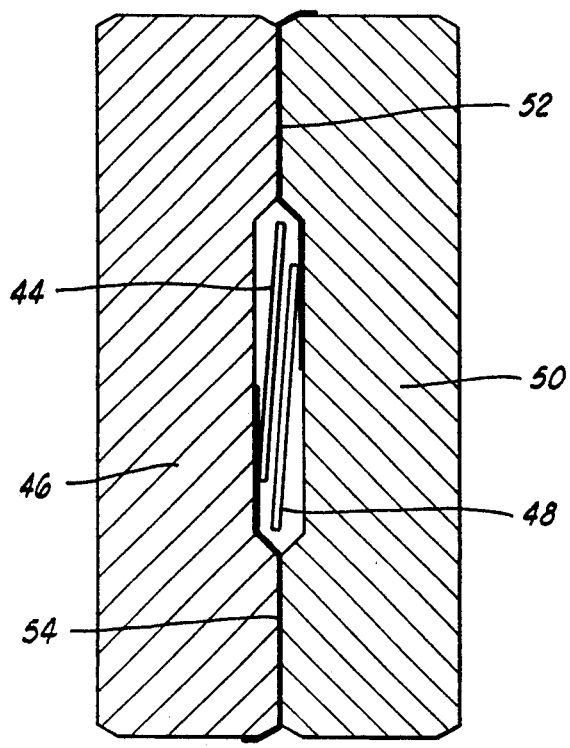
FIG. 4 is a sectional view of another embodiment of a temperature/reference package in which the present invention can be used.
Figure 5:
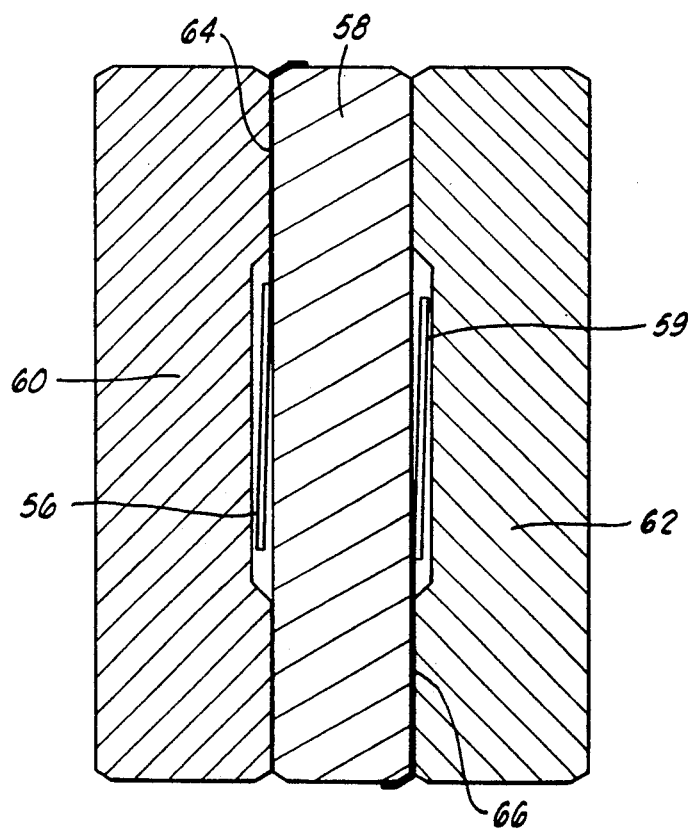
FIG. 5 is a sectional view of still another embodiment of a temperature/reference package in which the present invention can be used.

Referring to FIGS. 1-5, examples of particular implementations incorporating the present invention will be described. FIGS. 1-3 are taken from U.S. Pat. No. 4,802,370 to EerNisse et al., and FIGS. 4 and 5 are taken from copending U.S. patent application Ser. No. 07/999,441, filed Dec. 31, 1992 and entitled "Temperature/Reference Package, and Method Using the Same for High Pressure, High Temperature Oil or Gas Well", both of which are incorporated herein by reference.

FIG. 1 discloses a transducer 2 capable of sensing pressure and temperature and having utility within any applicable system, such as with a downhole memory recorder used for recording pressure and temperature data in an oil or gas well.

The transducer 2 broadly includes an electronics portion 4 having electrical components and circuits which operate in response to a sensor portion 6, which sensor portion 6 can be broadly referred to as an apparatus for providing one or more signals in response to one or more detectable characteristics. The electronics portion 4 and the sensor portion 6 are mounted within a support body of a suitable type as known to the art, such as shown in said U.S. Pat. No. 4,802,370 to EerNisse et al.

The electronics portion 4 includes well-known features of a transducer. Examples of these are oscillator circuits, mixer circuits and processor circuits (such as a microprocessor providing counting and computing capabilities). These types of circuits are known in the art. The electronics portion 4 is not part of the present invention as claimed and thus will not be further described.

The sensor portion 6 of the preferred embodiment of the present invention includes a crystalline housing in which the following active elements are disposed: characteristic sensing means for generating a signal having an identifiable feature, such as frequency, correlated to the detected characteristic, such as pressure, by a response which is variable with temperature (in the preferred embodiment this is a pressure sensing means 8 for sensing pressure); reference means 10 for generating a signal, having an identifiable feature of the same type as the signal of the characteristic sensing means, so that the identifiable feature of the reference means signal has a substantially constant value defining a reference value against which, or relative to which, the identifiable feature of the characteristic sensing means signal can be compared, which substantially constant value is dependent upon a response of the reference means variable with temperature; and a temperature sensing means 12 for generating a signal in response to the temperature where the characteristic sensing means and the reference means are collocated. The pressure and temperature to be sensed in the preferred embodiment are those existing within a chamber 14 defined in the support body of the transducer.

It is an important feature of the sensor portion 6 of the EerNisse et al. transducer that all of the pressure sensor 8, the reference device 10 and the temperature sensor 12 are collocated in the same chamber 14. The chamber 14 has a fluid medium in it for conducting to the pressure sensor 8 the pressure to be detected. In the preferred embodiment the fluid is a liquid, such as suitable oil of a type as known to the art. This fluid medium is throughout the chamber 14 so that the sensors 8, 12 and the reference device 10 are collocated within a common fluid medium and thus the overall sensor portion 6 is exposed to the pressure; however, it is noted that preferably the reference device 10 and the temperature sensor 12 are mounted in such a way that they are not significantly sensitive to the pressure communicated by the common fluid medium to the outer housing of the sensor portion 6, but they are sensitive to temperature transients created in or applied to the common fluid medium. This fluid is held within a fixed volume of the support body so that when the pressure within the volume changes, a concomitant temperature change occurs. The temperature of the fluid is also affected by the environmental temperature existing where the transducer 2 is located.

In the implementation depicted in FIG. 2, the sensor portion 6 has two distinct packages. The pressure sensor 8 includes its own package 16 having an outer crystalline housing in which a pressure sensitive or responsive element 18 is disposed. The reference device 10 and the temperature sensor 12 are combined in a common temperature/reference package 20 in which a reference control or setting element 22 and a temperature sensitive or responsive element 24 are disposed. The temperature/reference package 20 has an outer crystalline housing connected adjacent the outer housing of the pressure package 16 by a suitable connector means. One suitable connector means is an end retaining cap 26 shown in phantom in FIG. 3.

The temperature/reference package 20 is shown in the embodiment of FIG. 3 to particularly include two crystalline end pieces 28, 30 and a crystalline center piece 32 through which a hole 34 is defined and to which the two end pieces 28, 30 are connected by any suitable means known in the art, such as by glass sealing layers forming bonds when heated sufficiently. When completed, this housing of the package 20 has a cavity defined by the hole 34, which cavity is gas-filled or evacuated as appropriate and as known in the art. In the preferred embodiment the outer housing of the package 20 is made of crystalline quartz.

The reference element 22 of the temperature/reference package 20 includes a crystalline quartz resonator 36 (e.g., an SC-cut quartz crystal) connected to the end piece 28. This connection is by any suitable means known in the art, but preferably one reducing the communication of pressure to the resonator 36 (e.g., a single structural connection). When the package 20 is fully assembled, the resonator 36 is disposed in the interior cavity defined by the hole 34.

Two electrodes are connected to the resonator 36. These electrodes are coplanar layers, jointly identified by the reference numeral 38 but electrically separate, disposed between facing surfaces of the end piece 28 and the center piece 32. These electrodes allow the resonator 36 to be connected into a reference oscillator circuit within the transducer electronics section 4 in a manner as known in the art. The resonator 36 is the reference control element which controls or sets the frequency of the reference oscillator circuit in a manner known in the art. With the resonator 36 sealed in the package 20 and mounted by a suitable connection, the resonator 36 is substantially unaffected by the pressure of the common fluid in which the invention is used; therefore, the frequency of the oscillations provided through the natural or inherent response of the resonator 36 does not change in response to pressure. This response, and thus the frequency, are, however, affected by temperature; but through a preferred design of the package 20 wherein it is thermally matched with the package 16, this effect is compensated for, automatically and in real time, because the effects of temperature on the resonator and the pressure sensor package 16 and the resonator 36 will occur at substantially the same time.

The temperature responsive element 24 is connected to the crystal end piece 30 so that, preferably, pressure acting on the housing of the package 20 is not significantly communicated to the element 24 (e.g., such as a single structural connection to the end piece 30). In the preferred embodiment of the present invention the temperature responsive element 24 is an AC-cut crystalline quartz resonator 40, which is itself a known type of device and the end piece 30 is a Z-cut quartz plate as referred to above, which is itself a known type of cut as used in prior devices. When the temperature/reference package 20 is assembled, the resonator 40 is disposed in the cavity defined by the hole 34. Two electrodes disposed between the facing surfaces of the crystal pieces 30, 32 extend from the resonator 40 as indicated in FIG. 3 by the reference numeral 42. These electrodes are used to connect the resonator 40 to an oscillator of the transducer electronics section 4 in a manner as known in the art. The inherent response of the resonator 40 creates oscillations at a frequency which is correlated to the temperature conducted to the resonator 40 through the crystalline body of the temperature/reference package 16. The package 20, however, is sealed and the resonator 40 is mounted so that the resonator 40 is not significantly affected by the pressure outside the housing 20.

In FIG. 4 another embodiment of a temperature/reference package is shown. In this embodiment, an AC-cut crystal resonator 44 is mounted in a cavity of one Z-cut crystalline end piece 46 of the package, and a reference crystal 48 is mounted in a cavity of the other crystalline end piece 50 of the package. The two end pieces 46, 50 are connected directly together with only electrodes 52, 54 mounted in between.

In the embodiment of FIG. 5, an AC-cut temperature crystal 56 is mounted to one side of a Z-cut crystalline block 58 and a reference crystal 59 is mounted to the other side of the block 58. The block 58 is connected in between crystal end pieces 60, 62 of the type used in the embodiment of FIG. 4. Electrodes 64, 66 extend from the crystalline resonators 56, 59 along the respective sides of the block 58.

Mounting of the crystal resonators in the embodiments of FIGS. 4 and 5 is by suitable means as described above for the the embodiment of FIGS. 1-3.

The foregoing devices are adapted for use in the method of the present invention. By this method, at least temperature can be sensed in an oil or gas well.

The method includes lowering a crystalline housing into the well. This includes at least a crystalline package having the AC-cut crystal disposed therein. With regard to the embodiments of FIGS. 1-5, this would include any one of the temperature/reference packages and the accompanying pressure sensor package.

In the well the crystalline housing is exposed to both pressure and temperature. The crystalline members defining the outer body of such housing can withstand such pressure and temperature, but communicates them inwardly. Due to the desired mountings known in the art, only the pressure resonator 18 significantly responds to the pressure but all are affected by temperature. The temperature effect on the pressure resonator 18 is compensated by the reference resonator 22, and the temperature effect on the AC-cut temperature resonator 24 results in the temperature being thereby measured. Thus, the method of the present invention also includes responding to the temperature with the AC-cut crystal.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. In a pressure and temperature transducer of the type including a crystalline housing subjected to pressure and temperature in an oil or gas well, the improvement comprising a temperature resonator including means for sensing temperature in an oil or gas well within a range of temperatures extending beyond a range of temperatures sensible by a torsional mode tuning fork crystal, wherein said means includes an AC-cut crystal mounted in said crystalline housing to a Z-cut crystalline member thereof.

2. The transducer as defined in claim 1, wherein the range of temperatures extending beyond includes the range between about −10° C. and about −15° C.

3. The transducer as defined in claim 2, wherein the range of temperatures extending beyond further includes the range from above about 175° C. to about 250° C.

4. The transducer as defined in claim 1, wherein the range of temperatures extending beyond includes the range from above about 175° C. to about 250° C.

5. A dual crystalline resonator package for sensing temperature in an oil or gas well, comprising:
   a crystalline housing including a Z-cut quartz member;
   a crystalline reference resonator mounted in said crystalline housing; and
   a crystalline temperature resonator mounted in said crystalline housing, wherein said crystalline temperature resonator includes means for sensing temperature in an oil or gas well within a range of temperatures extending beyond a range of temperatures sensible by a torsional mode tuning fork crystal, wherein said means includes an AC-cut quartz crystal connected to said Z-cut quartz member.

6. A dual crystalline resonator package as defined in claim 2, wherein the range of temperatures extending beyond includes the range between about −10° C. and about −15° C.

7. A dual crystalline resonator package as defined in claim 6, wherein the range of temperatures extending beyond further includes the range from above about 175° C. to about 250° C.

8. A dual crystalline resonator package as defined in claim 2, wherein the range of temperatures extending beyond includes the range from above about 175° C. to about 250° C.

9. A method of sensing temperature in an oil or gas well, comprising:
   lowering a crystalline housing into the well, the crystalline housing having an AC-cut crystal connected therein to a Z-cut crystalline member of the housing;
   exposing the crystalline housing to pressure and temperature in the well; and
   sensing the temperature in the oil or gas well with the AC-cut crystal, wherein the temperature sensed is within a range of temperatures extending beyond a range of temperatures sensible by a torsional mode tuning fork crystal.

10. A method as defined in claim 9, wherein the range of temperatures extending beyond includes the range between about 31 10° C. and about −15° C.

11. A method as defined in claim 10, wherein the range of temperatures extending beyond further includes the range from above about 175° C. to about 250° C.

12. A method as defined in claim 9, wherein the range of temperatures extending beyond includes the range from above about 175° C. to about 250° C.

* * * * *